(12) United States Patent
Sugiyama et al.

(10) Patent No.: US 10,859,754 B2
(45) Date of Patent: Dec. 8, 2020

(54) LED LIGHT SOURCE DEVICE AND ELECTRONIC DEVICE USING THE SAME

(71) Applicant: MAXELL, LTD., Kyoto (JP)

(72) Inventors: Toshinori Sugiyama, Kyoto (JP); Koji Hirata, Kyoto (JP); Yasuhiko Kunii, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/089,411

(22) PCT Filed: Feb. 28, 2017

(86) PCT No.: PCT/JP2017/007738
§ 371 (c)(1),
(2) Date: Sep. 28, 2018

(87) PCT Pub. No.: WO2017/175517
PCT Pub. Date: Oct. 12, 2017

(65) Prior Publication Data
US 2019/0113672 A1    Apr. 18, 2019

(30) Foreign Application Priority Data

Apr. 5, 2016 (JP) ................................. 2016-076024
Apr. 6, 2016 (JP) ................................. 2016-076283

(51) Int. Cl.
*F21V 8/00* (2006.01)
*G02F 1/13357* (2006.01)
(Continued)

(52) U.S. Cl.
CPC ........... *G02B 6/0048* (2013.01); *G02B 6/002* (2013.01); *G02B 6/003* (2013.01); *G02B 6/0023* (2013.01);
(Continued)

(58) Field of Classification Search
CPC .... G02B 6/0048; G02B 6/003; G02B 6/0023; G02B 6/0025; G02B 6/00; G02B 27/0101; F21S 2/00; G02F 1/1335; G03B 21/2093
See application file for complete search history.

(56) References Cited

U.S. PATENT DOCUMENTS 9,004,692 B2 *  4/2015  Akiyama ........... G03B 21/2073
                                                353/20
9,568,657 B2 *  2/2017  Song ................... G02B 6/0036
(Continued)

FOREIGN PATENT DOCUMENTS

JP      07-294745 A     11/1995
JP      H11-224518 A    8/1999
(Continued)

OTHER PUBLICATIONS

ISR pct JP2017-007738, machine translation (Year: 2017).*
Japanese Office Action dated Apr. 21, 2020 for the Japanese Patent Application No. 2016-076283.

*Primary Examiner* — Tracie Y Green
(74) *Attorney, Agent, or Firm* — Volpe Koenig

(57) ABSTRACT

Provided is a compact light source device that can be manufactured at a low cost and is suitable as an illumination light source for a display device of an electronic device such as an HUD or an ultra-compact projector. This light source device includes a solid-state light source, a collimating optical system that converts light having exited the solid-state light source into a substantially collimated light; and a light guide that allows the light having exited the collimating optical system to enter and allows this light to exit in a direction that differs from a direction of entry. The light source device further includes a polarization converting element that aligns polarization directions of the light exiting the light guide into one direction.

11 Claims, 14 Drawing Sheets

(51) Int. Cl.
  *G03B 21/20* (2006.01)
  *G02B 27/01* (2006.01)
(52) U.S. Cl.
  CPC ..... *G02B 6/0038* (2013.01); *G02F 1/133603* (2013.01); *G02F 1/133605* (2013.01); *G02F 1/133606* (2013.01); *G02B 6/0025* (2013.01); *G02B 27/0101* (2013.01); *G02F 2001/133607* (2013.01); *G03B 21/20* (2013.01)

(56) References Cited

U.S. PATENT DOCUMENTS

| | | | |
|---|---|---|---|
| 9,939,718 B2 * | 4/2018 | Matsumoto | G03B 21/204 |
| 10,031,369 B2 * | 7/2018 | Wang | G02F 1/133553 |
| 2003/0227768 A1 | 12/2003 | Hara et al. | |
| 2008/0247150 A1 | 10/2008 | Itoh et al. | |
| 2010/0195022 A1 | 8/2010 | Shikii et al. | |
| 2011/0116010 A1 * | 5/2011 | Nagata | G02B 6/005 349/62 |
| 2012/0002137 A1 | 1/2012 | Saito et al. | |
| 2013/0057832 A1 * | 3/2013 | Akiyama | G03B 21/2073 353/20 |
| 2018/0017729 A1 * | 1/2018 | Fukuoka | G09F 9/00 |
| 2019/0113672 A1 * | 4/2019 | Sugiyama | G02F 1/1335 |

FOREIGN PATENT DOCUMENTS

| | | |
|---|---|---|
| JP | 2003-331626 A | 11/2003 |
| JP | 2004-0130297 A | 1/2004 |
| JP | 2007-073469 A | 3/2007 |
| JP | 2008-277279 A | 11/2008 |
| JP | 2011-233416 A | 11/2011 |
| JP | 2012-013969 A | 1/2012 |
| WO | 2009/011122 A1 | 1/2009 |
| WO | 2010/050489 A1 | 5/2010 |

\* cited by examiner (a)

(b)

(c)

(d)

$\beta 1 = \beta 2 = \beta 3 = \beta 4 = \cdots = \beta 122 = \cdots \beta 130$ (a)

(b)

COMPARATIVE EXAMPLE (a)

(b)

(a)

(b)

(a)

(b)

LED LIGHT SOURCE DEVICE AND ELECTRONIC DEVICE USING THE SAME

TECHNICAL FIELD

The present invention relates to a light source device that can be used as a planar light source, and particularly relates to a planar light source device suitable for use in an electronic device comprising an image display device intended to be downsized.

BACKGROUND ART

A compact and highly efficient light source device is desired as an illumination light source for a display device of a head up display (hereinafter referred to as "HUD") or an ultra-compact projector.

Conventionally, in order to achieve a compact and highly efficient light source device, a light source device utilizing a light guide made of a transparent resin on which a predetermined texture is formed has been known from Patent Document 1 listed below. In the light guide illumination device disclosed in Patent Document 1, light enters from a light guide end portion and is then scattered by the texture formed on the surface of the light guide, so that a thin and highly efficient light source device is achieved.

RELATED ART DOCUMENTS

Patent Documents

Patent Document 1: Japanese Unexamined Patent Application Publication No. H11-224518

SUMMARY OF THE INVENTION

Problems to be Solved by the Invention

Recent improvements in light-emitting efficiency of LEDs which are solid-state light sources have led to effective utilization of the LED as a light emitting source of the light source device. However, in an optical system utilizing the LED and an LED collimator that converts the LED light into a substantially collimated light, it was found that the shape of an optical system disclosed in the above-described related art (Patent Document 1) is still insufficient in terms of light-use efficiency characteristics and uniform illumination characteristics.

Therefore, a specific object of the present invention is to provide a light source device in which the light-use efficiency characteristics and uniform illumination characteristics of a laser ray from the LED light source are improved to achieve a downsized light source device that can be manufactured at a low cost and thus is suitable as an illumination light source for a display device of an electronic device such as an HUD or an ultra-compact projector. Another object of the present invention is to provide an electronic device comprising an image display device that uses this light source device.

Means for Solving the Problems

According to one aspect of the present invention that achieves the above-described objects, there is provided a light source device comprising: a solid-state light source; a collimating optical system that converts light having exited the solid-state light source into a substantially collimated light; and a light guide that allows the light having exited the collimating optical system to enter and allows this light to exit in a direction that differs from a direction of entry, wherein the light source device is further provided with a polarization converting element that aligns polarization directions of the light exiting the light guide into one direction.

In addition, according to the present invention, the electronic device that uses the above-described light source device as an image display device includes an HUD or a projector.

Effects of the Invention

According to the above-described invention, it is possible to achieve a downsized and highly efficient light source device that can be manufactured at a low cost.

DETAILED DESCRIPTION OF PREFERRED EMBODIMENTS

Hereinafter, embodiments of the present invention will be described in detail with reference to the drawings.

Embodiment 1

Figure 1:
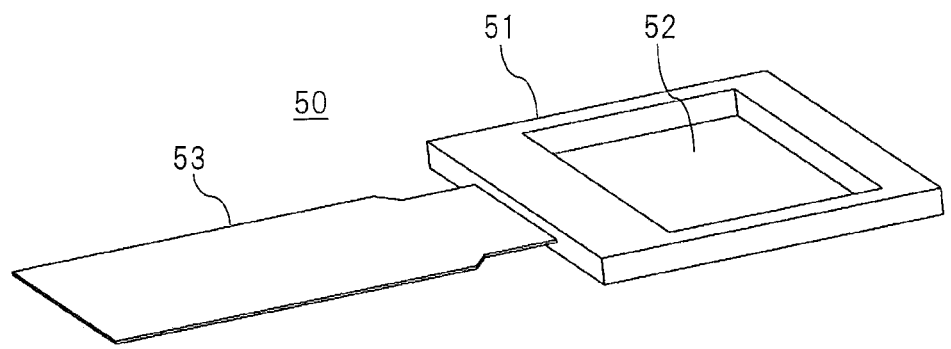
FIG. 1 is an exploded perspective view showing an outer appearance of an entire light source device according to Embodiment 1 of the present invention.
Figure 1:
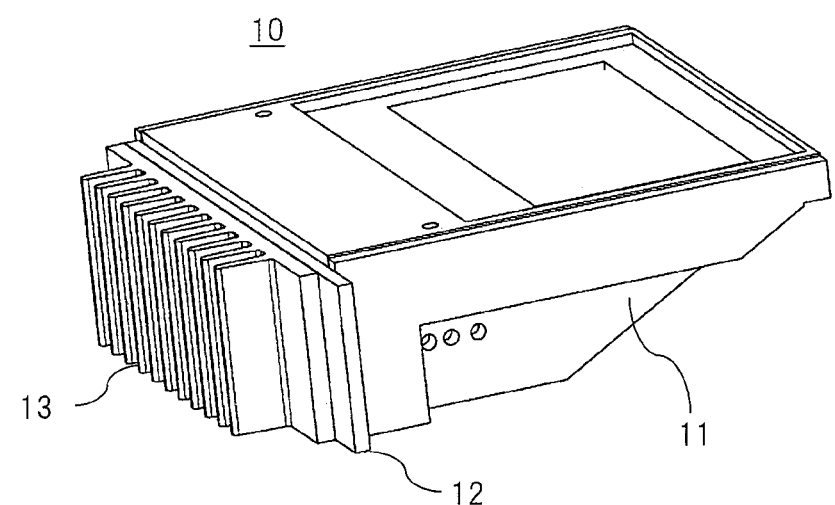

FIG. 1 is an exploded perspective view showing an outer appearance of a light source device according to Embodiment 1 of the present invention. As is apparent from the drawing, a light source device (main body) 10 is made of, for example, plastic or the like, and is constituted by a light source device case 11 in which an LED, a collimator, a synthetic diffuser block, a light guide and the like are housed, which will be described in detail below. A liquid crystal display element 50 is attached to an upper surface of the light source device case 11, an LED (Light Emitting Diode) element which is a semiconductor light source and an LED substrate 12 on which a control circuit of the LED element is mounted are attached to a side surface of the light source device case 11, and a heat sink 13 for cooling the heat generated in the LED element and control circuit is attached to an outer surface of the LED substrate 12.

Further, the liquid crystal display element 50 attached to the upper surface of the light source device case 11 is constituted by a liquid crystal display panel frame 51, a liquid crystal display panel 52 attached to this frame, and an FPC (flexible printed circuit) 53 electrically connected to this panel. Namely, the liquid crystal display panel 52 is controlled by a control signal from a control circuit (not shown) that configures the electronic device, which will be described in detail below.

Figure 2:
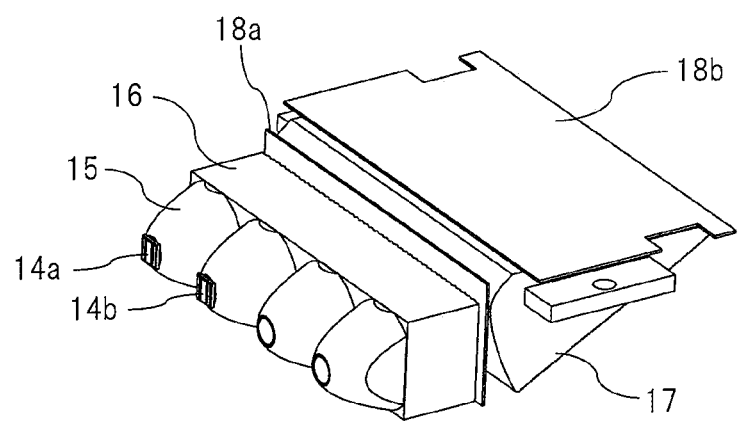
FIG. 2 is a perspective view showing an outer appearance of an internal configuration of an optical system in the light source device according to Embodiment 1.

FIG. 2 shows an internal configuration of the light source device 10, that is, an optical system housed inside the light source device case 11.

A plurality (four in this embodiment) of LEDs 14a to 14d (only two LEDs 14a and 14b are shown in FIG. 2) that configure the light source are respectively attached to bottom portions of LED collimators 15 each having a conically protruding outer shape that can be obtained by rotating a substantially parabolic cross-sectional line, and a rectangular synthetic diffuser block 16 is provided on a light-exiting side of the collimators. Namely, a laser ray emitted from the LED 14a or 14b is reflected by a parabolic boundary surface of the LED collimator 15 and enters the synthetic diffuser block 16 in a form of a collimated light.

Further, a rod-like light guide 17 having a substantially triangular shape in cross section is provided on an exit surface side of the synthetic diffuser block 16 with a first diffuser plate 18a interposed therebetween, and a second diffuser plate 18b is attached to an upper surface of the light guide 17. In this manner, horizontal light from the LED collimators 15 is reflected in an upward direction of the drawing by a function of the light guide 17 and is guided to an entrance surface of the liquid crystal display element 50. At this time, light intensity is made uniform by the first and second diffuser plates 18a and 18b.

<Detailed Structure of Light Guide>

Figure 3:
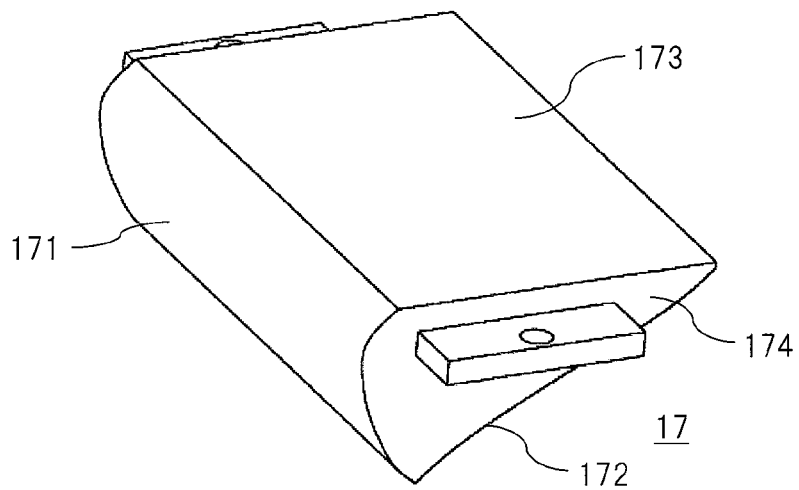
FIG. 3 includes a perspective view and partially enlarged cross-sectional views each describing details of a light guide in the light source device according to Embodiment 1.
Figure 3:
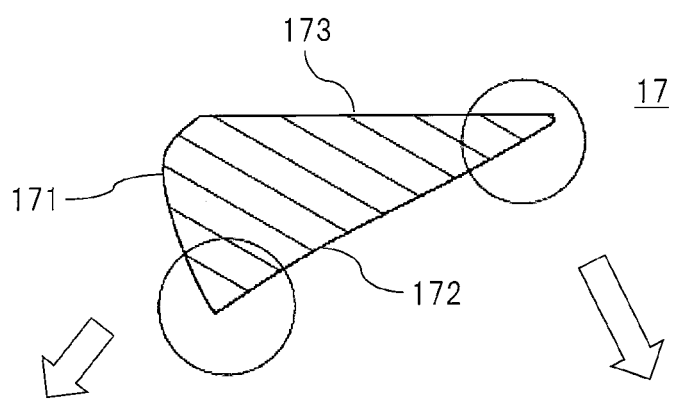
Figure 3:
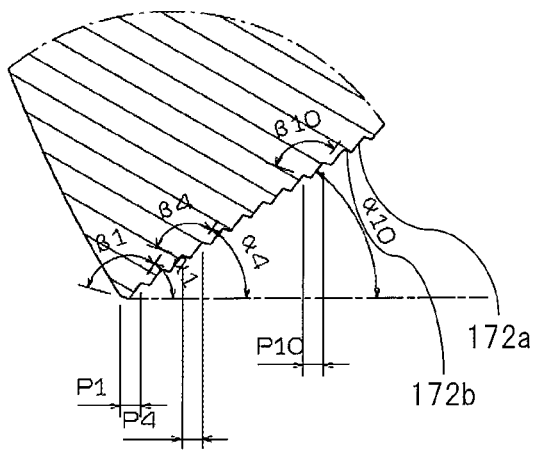
Figure 3:
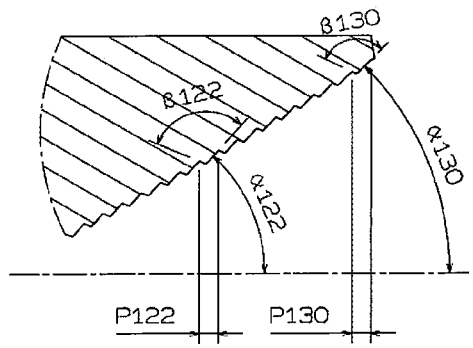

Next, details of the light guide 17 that configures the light source device 10 will be described with reference to the drawings. FIG. 3(a) is a perspective view showing the entire light guide 17, FIG. 3(b) shows a cross section of the light guide 17, and FIGS. 3(c) and 3 (d) are partially enlarged cross-sectional views showing details of the cross section.

The light guide 17 is a rod-like member that is made of a translucent resin such as an acrylic resin or the like and is formed so as to have a substantially triangular shape in cross section (see FIG. 3(b)), and as is apparent from FIG. 3(a), the light guide 17 comprises a light guide light entrance portion (surface) 171 facing the exit surface of the synthetic diffuser block 16 with the first diffuser plate 18a interposed therebetween, a light guide light reflection portion (surface) 172 forming an inclined surface, and a light guide light exit portion (surface) 173 facing the liquid crystal display panel 52 of the liquid crystal display element 50 with the second diffuser plate 18b interposed therebetween.

As shown in the partially enlarged views of FIGS. 3(c) and 3 (d), a large number of reflection surfaces 172a and connection surfaces 172b are alternately arranged on the light guide light reflection portion (surface) 172 of the light guide 17 so as to form a sawtooth-like shape. Further, each reflection surface 172a (line extending upward toward the right side in the drawing) forms an angle αn (where n denotes a natural number and ranges from, for example, 1 to 130 in this embodiment) with respect to a horizontal plane indicated by a dot-and-dash line in each drawing, and here, αn is set at an angle that is less than or equal to 52 degrees (but greater than or equal to 44 degrees) as an example.

On the other hand, each connection surface 172b (line extending downward toward the right side in the drawing) forms an angle βn (where n denotes a natural number and ranges from, for example, 1 to 130 in this embodiment) with respect to the reflection surface 172a. In other words, the connection surface 172b of the reflection portion is tilted at an angle within a range of half the angle of a scattering member, described below, such that the connection surface 172b is shadowed with respect to the light having entered. As described in detail below, α1, α2, α3, α4 . . . form an elevation angle of the reflection surface, and β1, β2, β3, β4 . . . form a relative angle between the reflection surface and the connection surface, and here, βn is set at an angle that is greater than or equal to 90 degrees (but less than or equal to 180 degrees) as an example. In this embodiment, $\beta1=\beta2=\beta3=\beta4=\ldots=\beta122=\beta130$ is satisfied.

Figure 4:
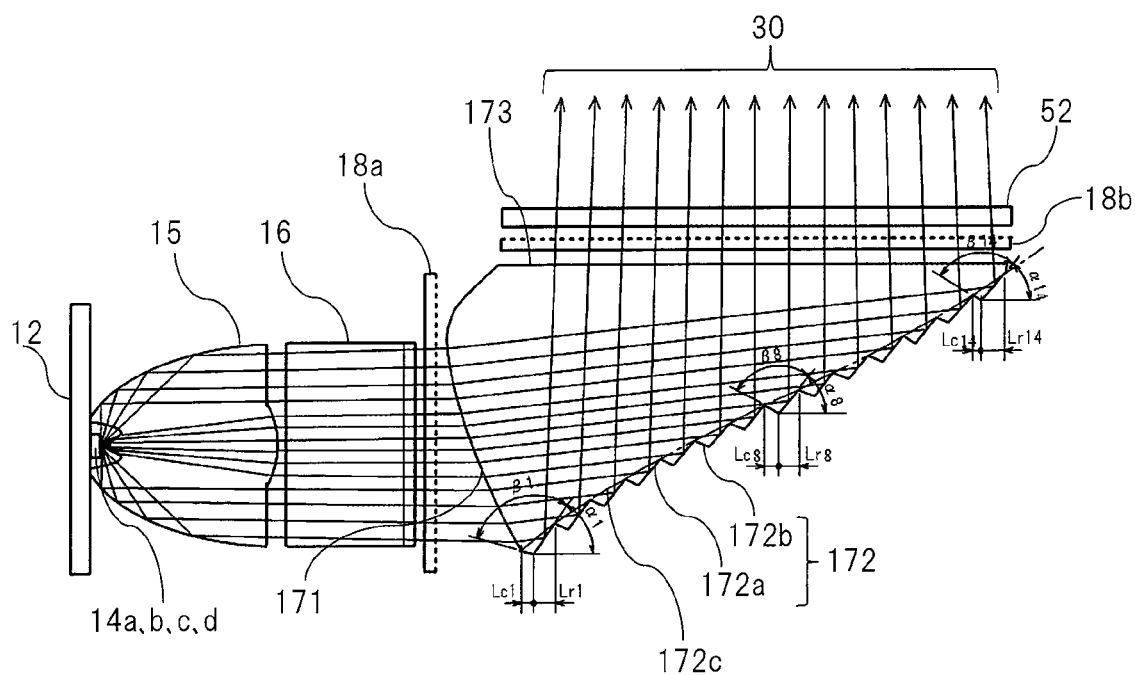
FIG. 4 is a side view describing details of an operation of the light guide in the light source device according to Embodiment 1.
Figure 5:
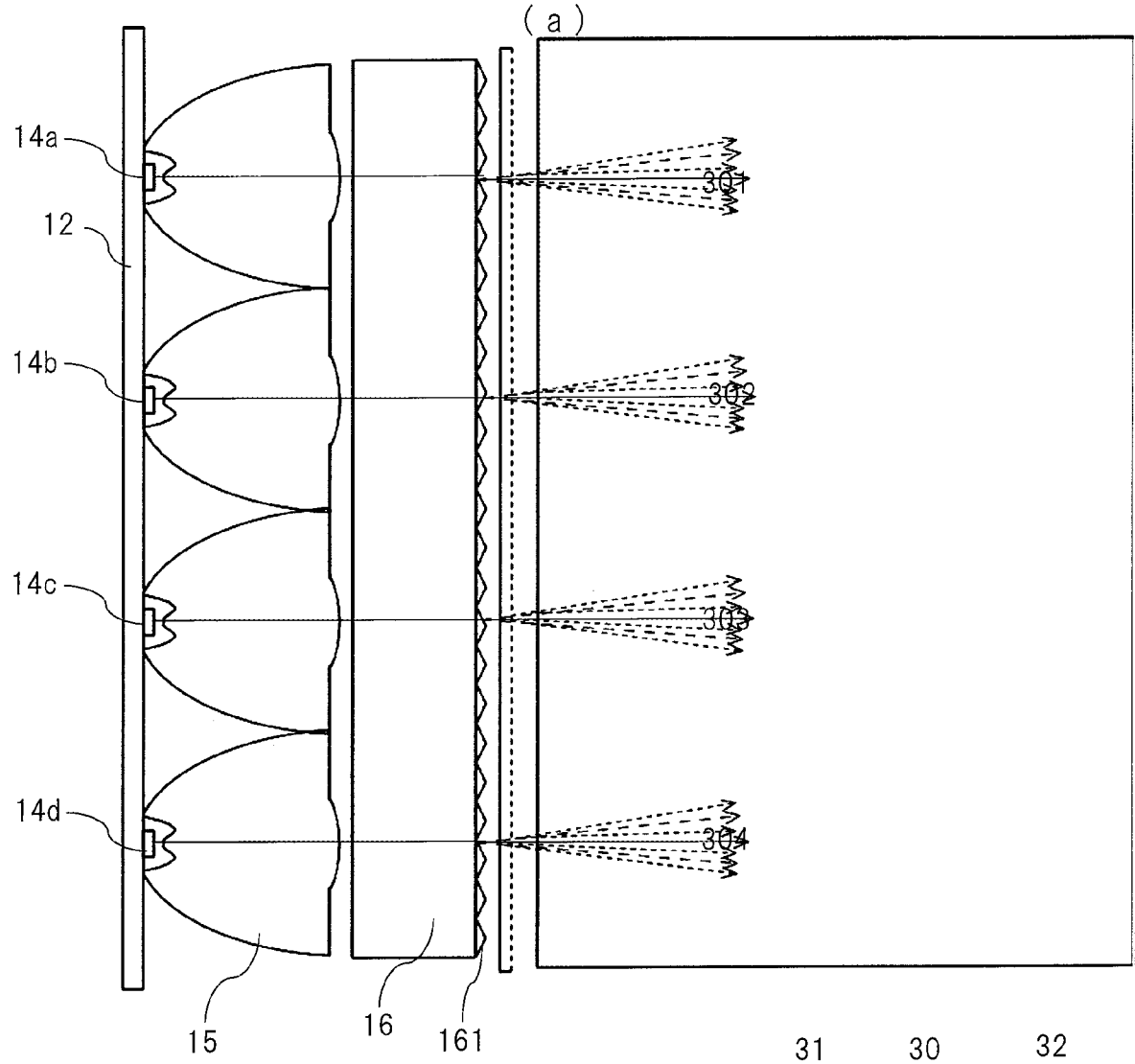
FIG. 5 includes upper and side views each describing details of the operation of the light guide in the light source device according to Embodiment 1.

FIGS. 4 and 5 show schematic drawings in which the reflection surfaces 172a and the connection surfaces 172b are relatively enlarged with respect to the light guide 17 for the sake of clarity. At the light guide light entrance portion (surface) 171 of the light guide 17, a main light beam is deflected at an angle $\delta$ in a direction in which an angle of entry increases with respect to the reflection surface 172a (see FIG. 5(b)). Namely, the light guide light entrance portion (surface) 171 is formed into a curved protruding shape that is tilted toward the light source. Accordingly, as apparent from the drawings, the collimated light from the exit surface of the synthetic diffuser block 16 is diffused via the first diffuser plate 18a, enters the entrance portion 171 and reaches the light guide light reflection portion (surface) 172 while being slightly refracted (deflected) upward by the light guide light entrance portion (surface) 171 (see comparative example of FIG. 6).

Note that a large number of reflection surfaces 172a and connection surfaces 172b are alternately arranged on the light guide light reflection portion (surface) 172 so as to form a sawtooth-like shape, and the diffused light is totally internally reflected upward by each of the reflection surface 172a and further enters the liquid crystal display panel 52 via the light guide light exit portion (surface) 173 and second diffuser plate 18b in a form of a collimated diffused light. Therefore, the elevation angles $\alpha1, \alpha2, \alpha3, \alpha4 \ldots$ of the reflection surfaces are set such that each of the reflection surfaces 172a is at an angle that is greater than or equal to a critical angle with respect to the diffused light, whereas the relative angles $\beta1, \beta2, \beta3, \beta4 \ldots$ between the reflection surfaces 172a and the connection surfaces 172b are set at a constant angle as described above, preferably at an angle that is greater than or equal to 90 degrees ($\beta n \geq 90°$). The reason for this will be described below.

Figure 6:
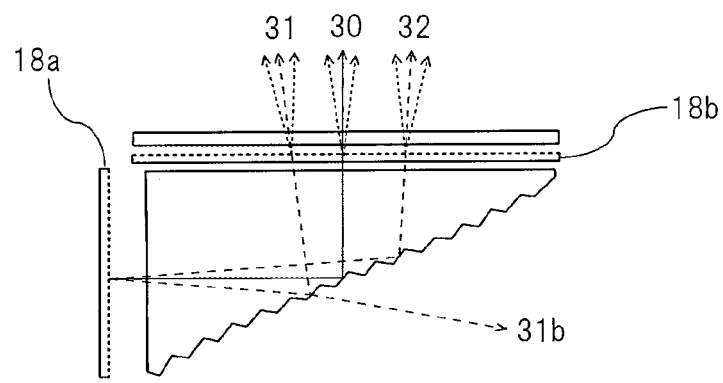
FIG. 6 is a drawing showing a comparative example for describing the operation of the light guide in the light source device according to Embodiment 1.

The configuration described above allows each of the reflection surfaces 172a to have a configuration in which its angle is always greater than or equal to the critical angle with respect to the diffused light, so that total internal reflection can be achieved in the reflection portion 172 even if no reflective film made of metal or the like is formed therein, and thus, it is possible to achieve the light source device at a low cost. In contrast, as shown in FIG. 6 which is a comparative example, if the main light beam is not refracted (deflected) at the light guide light entrance portion of the light guide 17, an angle of a portion 31b of the diffused light becomes less than or equal to the critical angle with respect to the reflection surface 172a, and consequently, since a sufficient reflectance cannot be achieved, it would not be possible to achieve a light source device with satisfactory (bright) characteristics.

In addition, the elevation angles $\alpha1, \alpha2, \alpha3, \alpha4 \ldots$ of the reflection surfaces have values that gradually increase from a lower position toward an upper position of the light guide light reflection portion (surface) 172. Since the light having passed through the liquid crystal display panel 52 of the liquid crystal display element 50 has a divergence angle to some extent, in order to particularly prevent an occurrence of the so-called light falloff in which a portion of the light having passed through a peripheral portion of the liquid crystal display panel 52 is shielded at a rim of a mirror arranged on a downstream side, the elevation angles are set so as to achieve a configuration in which the light beam at the peripheral portion of the liquid crystal display panel 52 is slightly deflected in a direction toward a center axis as indicated by the light beams 30 of FIG. 4.

Figure 9:
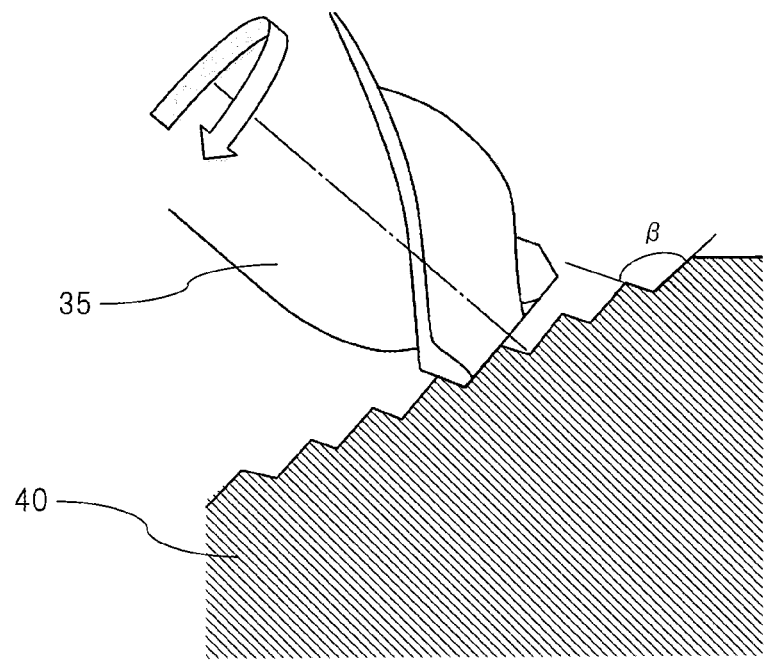
FIG. 9 is a drawing describing a method of machining a mold to be utilized for forming the light guide which is a component of the optical system in the light source device according to Embodiment 1.

As described above, the expression $\beta1=\beta2=\beta3=\beta4 \ldots \beta n \geq 90°$ is satisfied because, as shown in FIG. 9, when machining a metal mold 40 to be used for producing the light guide 17 by injection molding, the reflection surfaces 172a and the connection surfaces 172b can be simultaneously machined with using an end mill 35 having a relative angle of $\beta$ between its bottom and side surfaces. In addition, the reflection surfaces 172a and the connection surfaces 172b can be machined with using a relatively broad tool, meaning that it is possible to significantly shorten machining time and significantly reduce machining costs. Further, boundary edges between the reflection surfaces 172a and the connection surfaces 172b can be machined with high precision, meaning that it is possible to improve light guiding characteristics of the light guide 17.

Furthermore, reference signs Lr1, Lr2, Lr3, Lr4 . . . in the drawing each denote a projection length with respect to a horizontal plane of the reflection surfaces 172a, reference signs Lc1, Lc2, Lc3, Lc4 . . . in the drawing each denote a projection length with respect to a horizontal plane of the connection surfaces 172b, and a ratio between the reflection surface 172a and the connection surface 172b is configured such that the ratio, that is, Lr/Lc, can be varied depending on location. An intensity distribution of the main light beam 30 entering the light guide 17 does not necessarily coincide with an intensity distribution desired on an entrance surface of the liquid crystal display panel. Therefore, a configuration in which the intensity distribution is adjusted according to the ratio Lr/Lc between the reflection surface 172a and the connection surface 172b is adopted. Note that, as this ratio is increased, average intensity of the reflection light at the corresponding portion can be enhanced. In general, the light beam 30 entering the light guide tends to be relatively intense at its center portion, and thus, in order to correct this situation, the ratio Lr/Lc is configured so as to be varied depending on location, particularly such that intensity at the center portion is reduced. The configuration in which the ratio Lr/Lc is varied depending on location along with the configuration in which the elevation angles $\alpha1, \alpha2, \alpha3, \alpha4 \ldots$ of the reflection surfaces are varied depending on location allows an envelope line 172c indicating an approximate shape of the reflection portion 172 to be curved as shown in FIG. 4.

Further, an expression Lr1+Lc1=Lr2+Lc2=Lr3+Lc3=Lr4+Lc4 . . . =Lr+Lc≤0.6 mm is satisfied. Adopting such a configuration allows a repetitive pitch of the reflection surfaces to be the same as each other when viewed from the light exit surface 173 of the light guide 17. In addition, since the pitch is less than or equal to 0.6 mm, the exit surfaces appear as a continuous surface instead of individually separated surfaces when viewed through the liquid crystal display panel 52, and thus, when combined with the function and effects of the diffuser plates 18a and 18b, spatial luminance via the liquid crystal display panel 52 can be made uniform, so that display characteristics are improved. Namely, this configuration allows intensity distribution of the light entering the liquid crystal display panel 52 to be made uniform. On the other hand, if the value of Lr+Lc is less than 0.2 mm, not only would more machining time be required but it would also be difficult to precisely machine each of the reflection surfaces 172a, and thus, it is preferable that the value is greater than or equal to 0.2 mm.

Further, although not shown, the above-described value (sum of the lengths) of Lr+Lc may be configured so as to entirely or partially satisfy Lr1+Lc1>Lr2+Lc2>Lr3+Lc3>Lr4+Lc4 . . . , or Lr1+Lc1=Lr2+Lc2=Lr3+Lc3=Lr4+Lc4 . . . =Lr90+Lc90>Lr91+Lc91=Lr92+Lc92>Lr93+

Lc93 . . . >Lr130+Lc130, or Lr1+Lc1≥Lr2+Lc2≥Lr3+ Lc3≥Lr4+Lc4 . . . Lr130+Lc130. Adopting such a configuration allows the repetitive pitch of the reflection surfaces 172a to gradually decrease as the reflection surface gets closer to the exit surface 173 when viewed from the exit surface 173 of the light guide 17. Thus, this configuration allows the repetitive pitch of the reflection surfaces 172a to gradually decrease as the reflection surface gets closer to the diffuser plate 18b when viewed from the diffuser plate 18b of the light guide 17. Diffusion characteristics of the diffuser plate 18b is necessary to some extent since this repetitive structure of the reflection surfaces 172a causes visibility to increase and uniformity of the light intensity to be impaired toward the diffuser plate 18b. However, by adopting the above-described configuration, the repetitive pitch of the reflection surfaces arranged at positions close to the diffuser plate 18b can be reduced such that a uniformity of the light intensity is enhanced even if the diffusion characteristics of the diffuser plate are low, and thus, it is possible to improve light-use efficiency. In addition, it is preferable that the value of Lr+Lc is set within a range from 0.2 mm to 0.6 mm as described above.

The above-described shape of the light guide light reflection portion (surface) 172 of the light guide 17 allows conditions for totally internally reflecting the main light to be satisfied, allows the light to be efficiently reflected without providing a reflective film made of aluminum or the like on the reflection portion 172, and makes it unnecessary to perform depositing or the like of an aluminum thin film that can cause an increase in manufacturing cost, and thus, it is possible to achieve a bright light source at a low cost. In addition, each of the relative angles β is set at an angle such that the connection surface 172b is shadowed with respect to the light of the main light beam 30 diffused by the synthetic diffuser block 16 and the diffuser plate 18a. By suppressing entry of unnecessary light from the connection surfaces 172b in this manner, unnecessary light reflection can be reduced, and thus, it is possible to achieve a light source device with satisfactory characteristics.

In general, it is preferable that an inclination of the main light beam entering the liquid crystal display panel is substantially vertical. However, depending on the characteristics of the liquid crystal display panel, it is also possible to set the inclination at an angle η as shown in FIG. 5(b). Namely, it is preferable for some of the liquid crystal display panels available on the market to have an angle of entry that is tilted at approximately 5 to 10 degrees in order to achieve satisfactory characteristics, and in such a case, it is preferable that η is set at 5 to 10 degrees depending on the characteristics.

In addition, instead of tilting the panel at angle η, it is also possible to adjust the angle of the reflection surfaces 172a and tilt the inclination of the main light beam toward the liquid crystal display panel. Further, by setting the inclination of the inclined surfaces of a triangular texture 161 formed on the exit surface of the synthetic diffuser block 16 so as to be in a left-right asymmetry, or by changing formation directions of the texture constituted by the reflection surfaces 172a and 172b, the inclination of the light beam can be tilted toward the side surfaces of the light guide when necessary.

Figure 7:
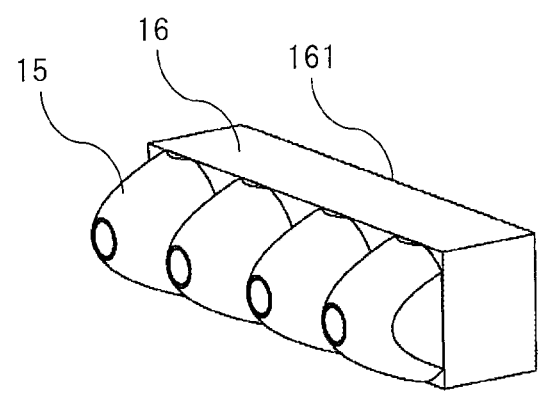
FIG. 7 is a perspective view describing details of collimators and a synthetic diffuser block in the light source device according to Embodiment 1.
Figure 8:
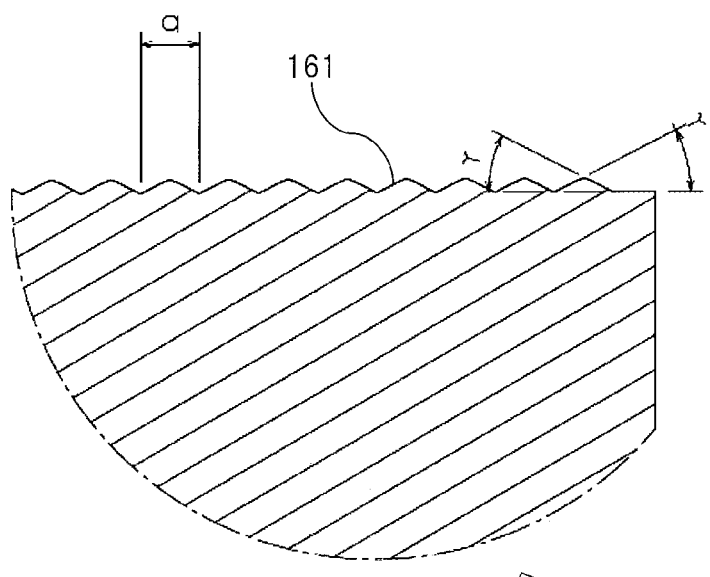
FIG. 8 includes partially enlarged cross-sectional views each describing details of the synthetic diffuser block in the light source device according to Embodiment 1.
Figure 8:
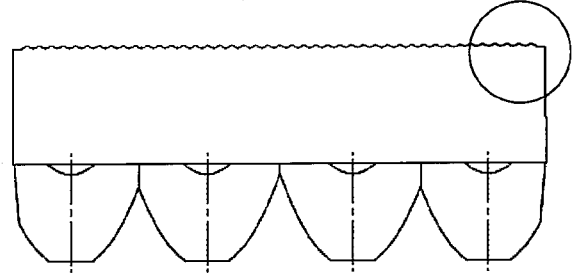

Next, the synthetic diffuser block 16 which is another component of the light source device 10 will be described with reference to FIGS. 7 and 8. FIG. 7 shows the synthetic diffuser block 16 integrated with the LED collimators 15, and FIGS. 8(a) and 8(b) each show a partially enlarged cross section of the synthetic diffuser block 16.

As is apparent from FIG. 8(a), the texture 161 having a large number of substantially triangular shapes in cross section is formed on the exit surface of the synthetic diffuser block 16, and the function of the texture 161 allows the light exiting the LED collimators 15 to be diffused to the entrance portion (surface) 171 of the light guide 17 in a vertical direction of the drawing plane. Even if the LED collimators 15 are discretely arranged, intensity distribution of each light exiting the exit portion 173 of the light guide 17 can be made uniform by interaction between the substantially triangular shapes of the texture 161 and the diffuser plates 18a and 18b. In particular, the diffusion characteristics in the direction toward the side surfaces is controlled by the texture 161 limiting a diffusing direction in the direction toward the side surfaces of the light guide, so that isotropic light diffusion characteristics of the above-described first and second diffuser plates 18a and 18b can be reduced, and thus, it is possible to improve the light-use efficiency and achieve the light source device with satisfactory characteristics. In this embodiment, the substantially triangular shapes of the texture 161 are each set at an angle of γ=30 degrees with forming pitches of "a"=0.5 mm as an example.

As described above in detail, according to the light source device 10 of the present invention, it is possible to further improve the light-use efficiency and uniform illumination characteristics of the laser ray from the LED light source while manufacturing a downsized light source device at a low cost, and thus, it is possible to provide a light source device particularly suitable as the illumination light source for a display device of an electronic device such as an HUD, an ultra-compact projector or the like.

<Modification of Light Source Device>

Figure 10:
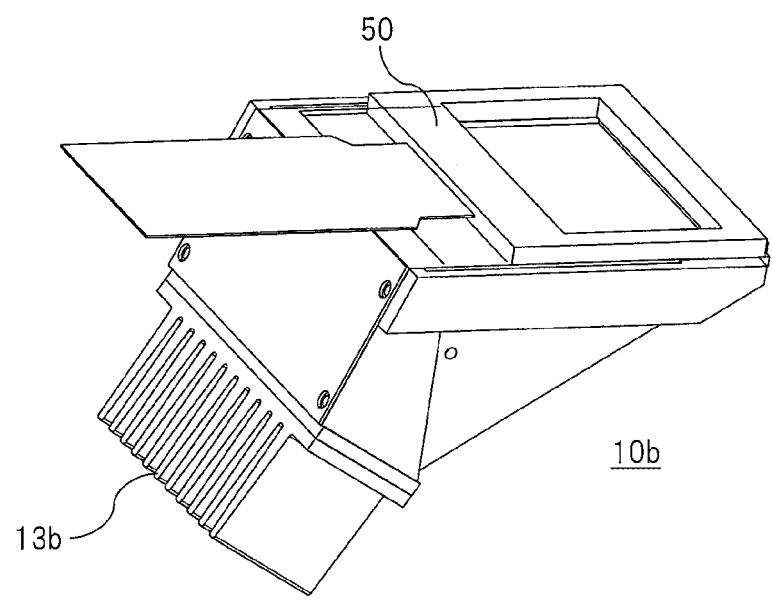
FIG. 10 is an external perspective view showing an outer appearance of an entire light source device which is a modification of the light source device according to Embodiment 1 of the present invention.
Figure 11:
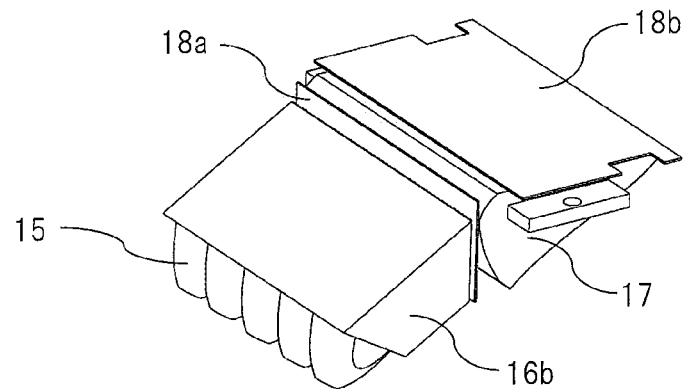
FIG. 11 is a perspective view showing an outer appearance of an internal configuration for the optical system in the light source device which is a modification of the light source device according to Embodiment 1 of the present invention.

In addition, FIGS. 10 and 11 each show a modification of the light source device according to Embodiment 1 of the present invention and respectively show perspective views of an entire outer appearance of a light source device 10b as the modification and an internal configuration thereof. In this modification, a synthetic diffuser block 16b having a substantially trapezoidal shape in cross section is used such that the plurality of LED collimators 15 each having a conically protruding shape to which an LED is mounted are attached at a lower inclined position of the device. Reference sign 13b in the drawing denotes a heat sink for cooling the heat generated in the LED element and control circuit.

<Another Modification of Light Source Device>

Figure 12:
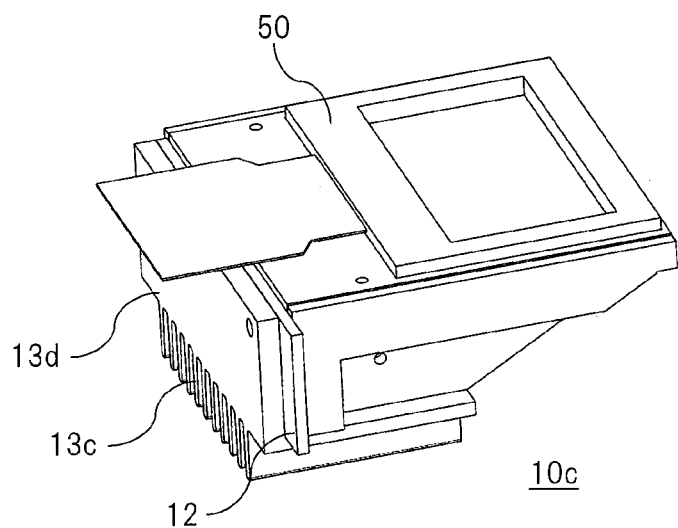
FIG. 12 is an external perspective view showing an outer appearance of an entire light source device according to another modification of the light source device of Embodiment 1 of the present invention.

Further, FIG. 12 shows another modification of the light source device according to Embodiment 1 of the present invention and shows a perspective view of an entire outer appearance of the light source device 10c as another modification. Although not shown in detail, this modification has a structure in which the heat generated in the LED substrate 12 is cooled by a heat sink 13c arranged on a lower portion of the device via a heat transfer plate 13d. With this configuration, it is possible to achieve alight source device having a short overall length.

<Modification of Collimator in Light Source Device>

Figure 13:
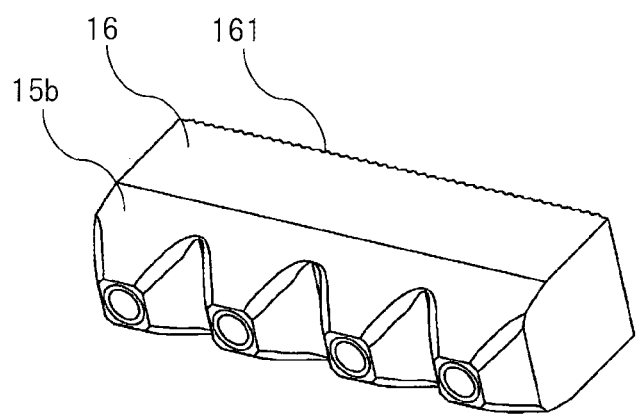
FIG. 13 is a perspective view showing another form of the collimator and a shape of the synthetic diffuser block in the light source device according to Embodiment 1 of the present invention.

Further, FIG. 13 shows a modification of the collimators 15b in the light source device according to Embodiment 1 of the present invention and shows an exemplary shape in which the collimators are combined with the above-described synthetic diffuser block 16. Each shape of the collimators shown in FIGS. 7 and 8 has a conically protruding outer shape that can be obtained by rotating a substantially parabolic cross-sectional line, whereas each shape of the collimators in this modification basically has a substantially quadrangular-pyramidal protruding shape with its corners chamfered or formed into a curved shape. Although the rotated parabolic shape shown in FIGS. 7 and 8 is suitable in terms of light efficiency of the light having exited the LED and exiting the light guide 17, this configuration allows boundaries of the substantially quadrangular-pyramidal protruding shapes to be connected more smoothly, and thus, it is possible to achieve light intensity distribution with higher uniformity.

It should be obvious that the light source devices 10b and 10c which are modifications of the above-described light source device of the present invention each have the same advantageous functions and effects as the light source device 10 shown in FIG. 1. Selecting the appropriate light source device 10, 10b or 10c allows a suitable and secure attachment inside a housing space in the electronic device such as an HUD or an ultra-compact projector which occasionally differs in shape and form.

<Application Examples of Light Source Device>

In addition, examples in which the above-described light source device 10 of the present invention is mounted on an HUD and an ultra-compact projector will be described as representative examples of the electronic device that uses the light source device 10 as the light source for its display device will be described.

Figure 14:
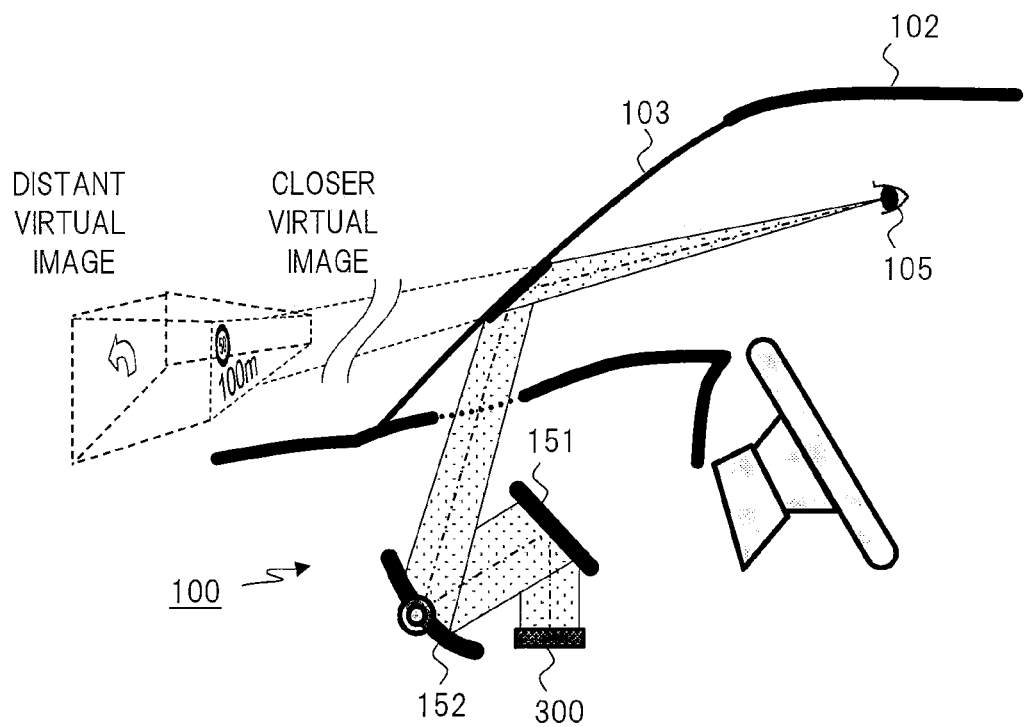
FIG. 14 is a drawing showing a configuration of an HUD using the light source device according to Embodiment 1 of the present invention as an illumination light source for its display device.
Figure 14:
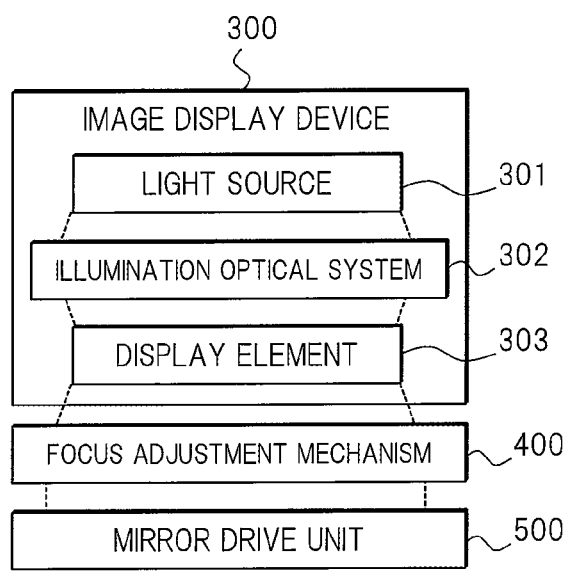

FIG. 14 (a) shows an example in which the above-described light source device according to Embodiment 1 of the present invention is applied to an HUD. In the head up display apparatus 100 of this drawing, video that is displayed on a video display apparatus 300 constituted by a projector, an LCD (liquid crystal display) and the like is reflected by a mirror 151 and another mirror 152 (for example, a free-form surface mirror, a mirror having an asymmetric shape with respect to an optical axis, or the like) and is projected on a windshield 103 of a vehicle 2. On the other hand, a driver 105 sees the video projected on the windshield 103 and recognizes the video as a virtual image shown in front of the transparent windshield 103.

FIG. 14(b) shows an example of the head up display apparatus 100 and particularly shows an example of an internal configuration of its video display apparatus 300. As is apparent from the drawing, the video display apparatus 300 is shown as a projector in this case, and the video display apparatus 300 has units such as a light source 301, an illumination optical system 302, a display element 303 and the like. Adopting the above-described light source device 10 of the present invention as the light source 301 allows a satisfactory illumination light to be generated for projection.

In addition to the display element 303 which is an element for generating the video to be projected, this example includes the illumination optical system 302 which is an optical system that collects the illumination light generated in the light source 301, makes the light more uniform and irradiates the light to the display element 303. However, these elements in this example are included in the light source device 10 of the present invention as the synthetic diffuser block 16, the first diffuser plate 18a, the light guide 17, the second diffuser plate 18b and the liquid crystal display panel 52. Therefore, the light source device 10 of the present invention can be used as the video display apparatus 300 of the head up display apparatus 100 without any modification. Accordingly, it is possible to achieve the head up display apparatus 100 that can be easily attached particularly in a narrow space such as on a dashboard of an automobile.

It should be obvious to one skilled in the art that the light emitted from the video display apparatus 300 is then projected on the windshield 103 of the vehicle 102 via a focus adjustment mechanism 400 and a mirror drive unit 500.

Figure 15:
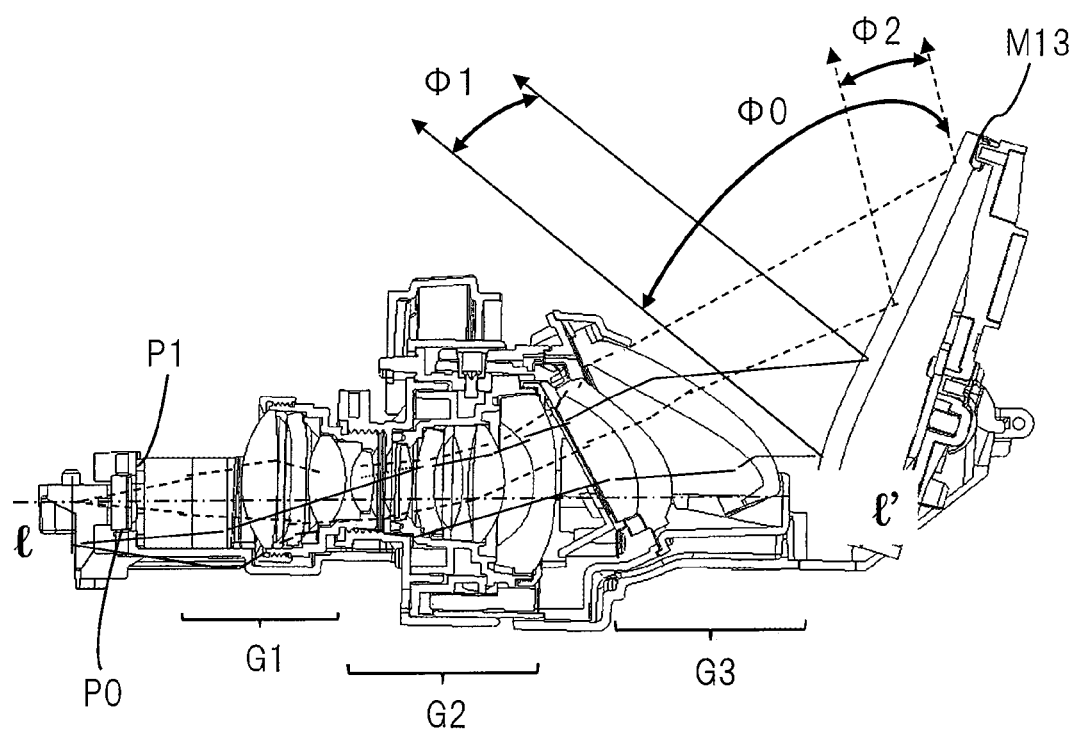
FIG. 15 is a drawing showing a configuration of a projector using the light source device according to Embodiment 1 of the present invention as an illumination light source for its display device.

FIG. 15 shows an example in which the above-described light source device of the present invention is applied to a projector. As is apparent from the drawing, the projector is constituted by a plurality of lens groups denoted by reference signs G1 to G3 and a single mirror denoted by reference sign M13. In the drawing, projection light is indicated by a solid-line arrow or a broken line arrow.

In addition, a light source P0 and a video display element (reflective video display element) P1 in the drawing are arranged on opposite surfaces of a prism optical element, and here, adopting the above-described light source device 10 of the present invention as the light source P0 allows a satisfactory illumination light to be generated. These elements in this example are also included in the light source device 10 of the present invention as the synthetic diffuser block 16, the first diffuser plate 18a, the light guide 17, the second diffuser plate 18b and the liquid crystal display panel 52, and therefore, the light source device 10 of the present invention can be attached inside the projector without any modification. Accordingly, the light source device can be easily attached in a space within a projector, and thus, it is possible to achieve a more compact and inexpensive projector.

As described above in detail, using the light source device 10 of the present invention as the illumination light source for the display device makes it possible to achieve a more compact and inexpensive electronic device that can be easily attached in a small space.

Embodiment 2

Next, a second embodiment (Embodiment 2) of the present invention will be described in detail. Unlike Embodiment 1, Embodiment 2 focuses on transmittance of polarized waves in the liquid crystal display panel 52 that configures the liquid crystal display element 50 to which the illumination light from the light source device enters, and further provides a polarization converting element that aligns polarization directions of the light having exited the collimating optical system into one direction, so that a more downsized and highly efficient light source device is achieved.

Figure 16:
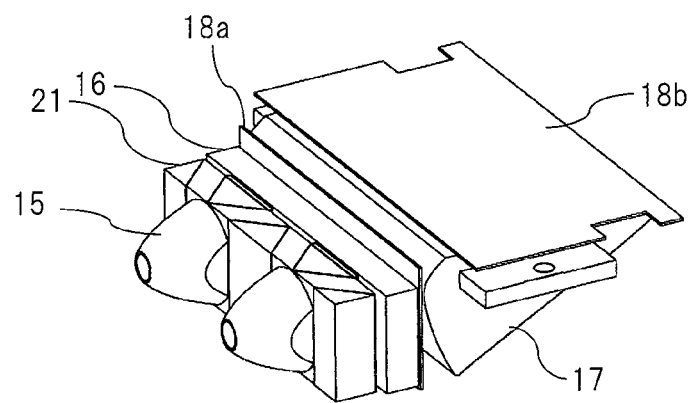
FIG. 16 is a perspective view showing an example of a structure of an optical system in the light source device according to Embodiment 2 of the present invention.
Figure 17:
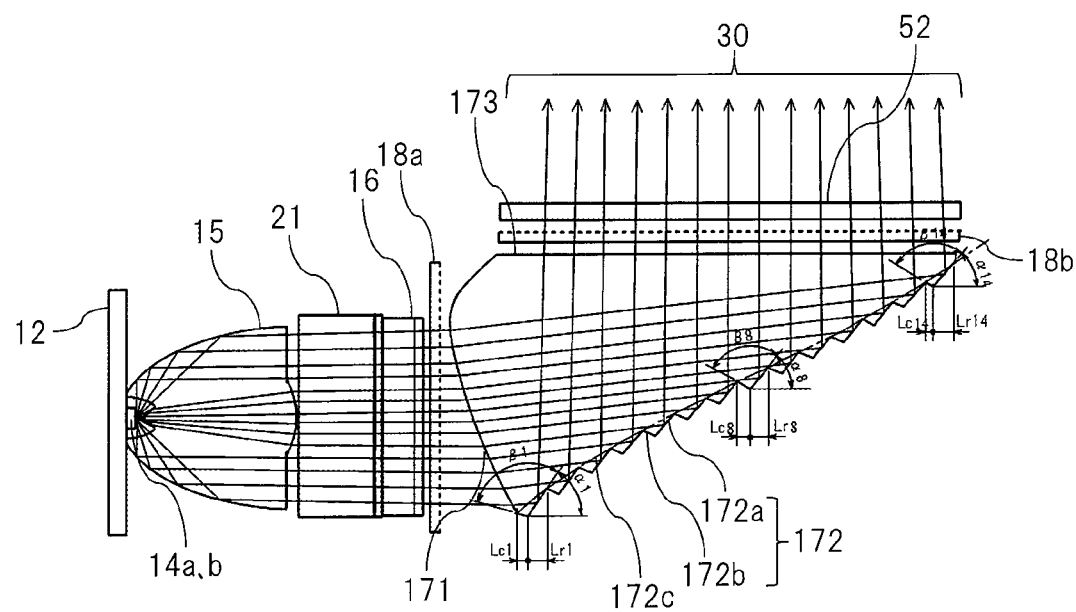
FIG. 17 is a side view showing an operation in the optical system in the light source device according to Embodiment 2.
Figure 18:
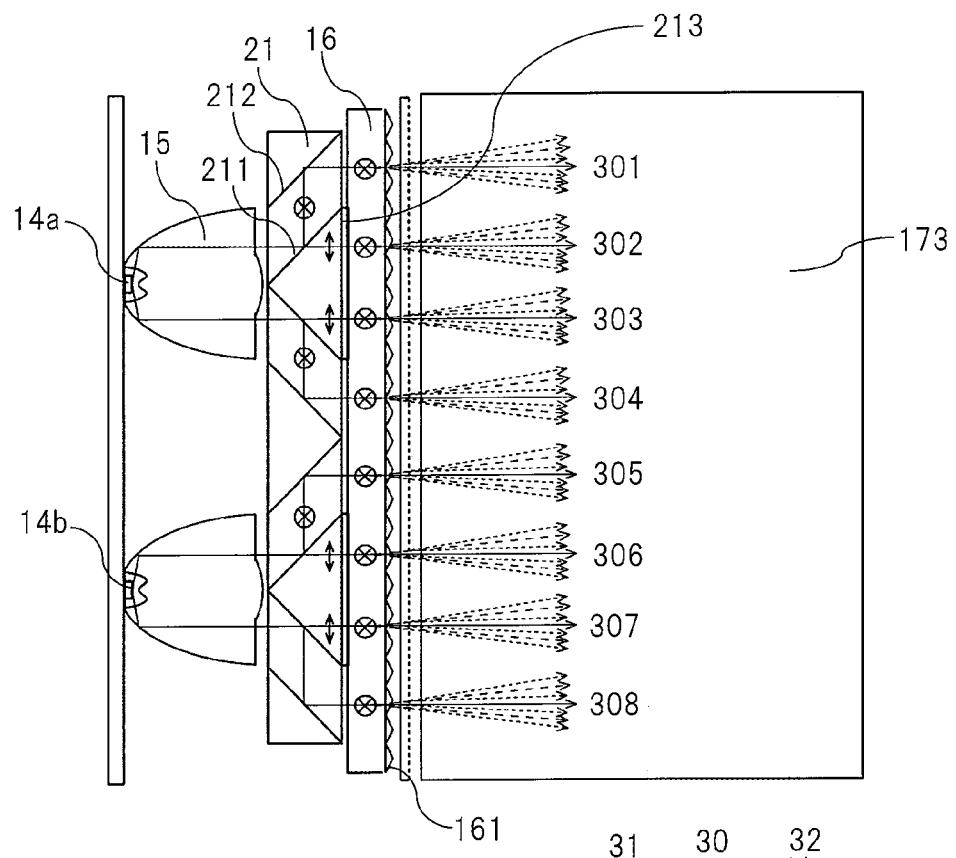
FIG. 18 includes upper and side views describing details of an operation of the light guide in the light source device according to Embodiment 2.
Figure 18:
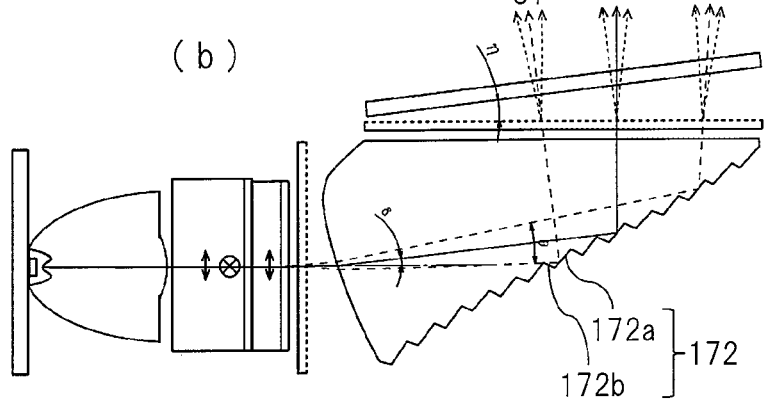

FIGS. 16 to 18 each show a configuration of the light source device according to Embodiment 2 of the present invention and particularly show a configuration of the optical system which is a feature of Embodiment 2. Namely, two LEDs 14a and 14b that configure the light source are provided in Embodiment 2 which is half the number of LEDs provided in the configuration of the above-described Embodiment 1, and a polarization converting element 21 is provided between the LED collimators 15 and the synthetic diffuser block 16. Other configurations in the drawings are the same as those of Embodiment 1 and are denoted by the same reference signs, and thus, redundant descriptions of the details will be omitted here.

As is apparent from these drawings and particularly from FIG. 18(a), the polarization converting element 21 is formed by combining a column-like translucent member (hereinafter referred to as parallelogram column) having a parallelogram shape in cross section and extending in a vertical direction of the drawing plane and a column-like translucent member (hereinafter referred to as triangular column) having a triangular shape in cross section and extending in a vertical direction of the drawing plane and by arranging several of these combined members in an array pattern so as to be parallel (vertical direction with respect to the drawing plane) to a plane orthogonal to an optical axis of the collimated light from each of the LED collimators 15. Further, a polarization beam splitter (hereinafter abbreviated to "PBS") film 211 and a reflective film 212 are alternately provided at interfaces between the translucent members adjacent to one another and arranged in the array pattern, and a ½λ phase plate 213 is provided on an exit surface that allows the light having entered the polarization converting element 21 and having passed through the PBS film 211 to exit.

In this manner, the polarization converting element 21 is configured so as to be symmetrical with respect to a plane (vertical plane extending in a vertical direction with respect to the drawing plane) constituted by an optical axis of the collimated light from the LED collimator 15 and an extending direction of the translucent member of the parallelogram column, or the so-called optical plane of the collimated light. In addition, inclination of each of the parallelogram and triangular columns of the translucent members which are components of the polarization converting element 21 is 45 degrees with respect to the optical plane. Further, the polarization converting element 21 configures each of the polarization converting elements divided into two sets in the vertical direction of the drawing with respect to the collimated light from the two LED collimators 15.

According to the polarization converting element 21 configured as described above and as shown in FIG. 18(*a*), an S-polarized wave (see symbol (x) in the drawing) of the light having exited the LED 14*a* and having entered as a collimated light via the LED collimator 15 is reflected by the PBS film 211, is further reflected by the reflective film 212, and reaches an entrance surface of the synthetic diffuser block 16. On the other hand, a P-polarized wave (see vertical arrows in the drawing) passes through the PBS film 211, is converted into an S-polarized wave by the ½λ phase plate 213, and reaches the entrance surface of the synthetic diffuser block 16.

In this manner, the polarization converting element 21 allows all of the light having exited the (plurality of) LEDs and converted into a collimated light by the LED collimator 15 to enter the entrance surface of the synthetic diffuser block 16 as an S-polarized wave. Subsequently, the light emitted from the exit surface of the synthetic diffuser block 16 enters the above-described light guide 17 via the first diffuser plate 18*a*, is further reflected in an upward direction of the drawing by the function of the light guide 17, and is guided to the entrance surface of the liquid crystal display element 50 in the same manner as Embodiment 1. The function of the light guide 17 has been described above in detail, and thus, redundant descriptions of the details will be omitted here.

Figure 19:
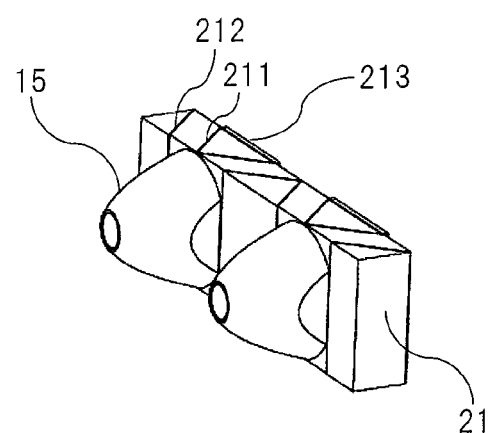
FIG. 19 is a perspective view showing an example of structures of LED collimators and a synthetic diffuser block which are components of the optical system in the light source device according to Embodiment 2.
Figure 20:
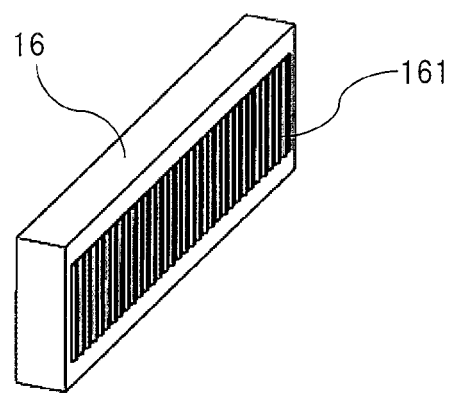
FIG. 20 is a perspective view showing an example of a structure of the synthetic diffuser block which is a component of the optical system in the light source device according to Embodiment 2.
Figure 21:
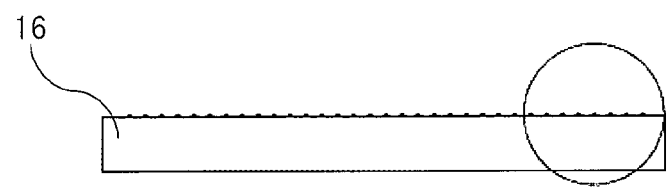
FIG. 21 includes a cross-sectional view describing details of the synthetic diffuser block in the light source device according to Embodiment 2 and a partially enlarged cross-sectional view thereof.
Figure 21:
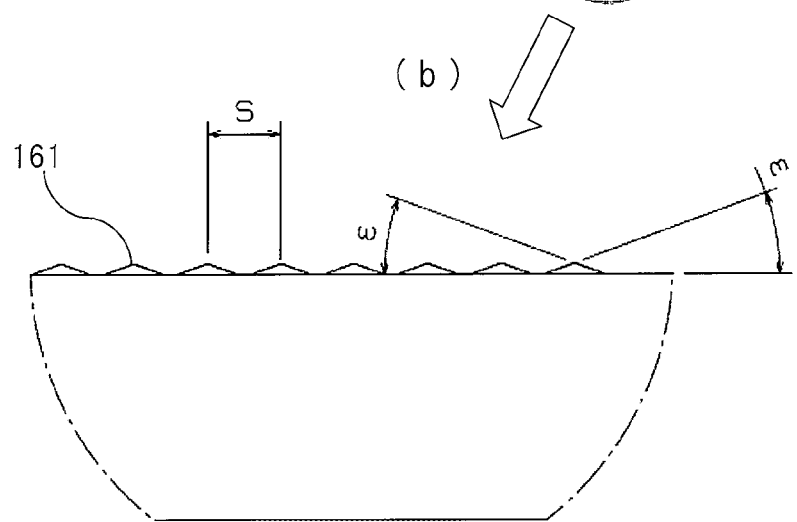

FIG. 19 is a perspective view showing a state in which the two LED collimators 15 described above are attached to the polarization converting element 21. In addition, FIG. 20 is a perspective view showing a configuration of an outer appearance of the synthetic diffuser block 16 to be attached to the exit surface side of the polarization converting element, and FIG. 21 includes a side view showing a detailed structure of the synthetic diffuser block 16 and a partially enlarged cross-sectional view thereof. As is apparent from these drawings, the texture 161 having a large number of substantially triangular shapes in cross section in Embodiment 2 is formed on the exit surface of the synthetic diffuser block 16 in the same manner as Embodiment 1. Note that details thereof have been described above and thus will be omitted here.

Namely, the above-described light source device of Embodiment 2 allows the light entering the liquid crystal display panel 52 that configures the liquid crystal display element 50 to be converted into an S-polarized wave by the polarization converting element 21, so that transmittance of the light in the liquid crystal display panel can be improved and the number of light-emitting sources (LEDs) can be reduced, and thus, it is possible to achieve a more compact and highly efficient light source device at a much lower cost. The polarization converting element 21 has been described above as a component that is attached to a rear side of the LED collimator 15. However, it should be obvious to one skilled in the art that the present invention is not limited to this configuration and that it is possible to achieve the same advantageous functions and effects in a case where the polarization converting element 21 is provided in an optical path that reaches the liquid crystal display element.

Further, the liquid crystal display panel has been described as having excellent transmittance with respect to the S-polarized wave. However, it should be obvious to one skilled in the art that the same advantageous functions and effects can again be achieved by a polarization converting element having the same configuration as described above even in a case where the liquid crystal display panel has excellent transmittance with respect to the P-polarized wave. It should also be obvious to one skilled in the art that the above-described light source device of Embodiment 2 can be used as a light source for an electronic device such as a head up display apparatus, a projector or the like in the same manner as the light source device of Embodiment 1.

In the foregoing, the planar light source device suitable for use in an electronic device comprising an image display device according to various embodiments of the present invention has been described. However, the present invention is not limited to the foregoing embodiments and may include various modifications. For example, in each of the foregoing embodiments, the entire system has been described in detail for the sake of easily describing the present invention. However, the present invention is not limited to comprise all of the configurations described above. In addition, a portion of the configuration of one of the embodiments can be replaced with the configuration of another embodiment. Further, the configuration of one of the embodiments can be added to the configuration of another embodiment. Furthermore, other configurations may be added to, be removed from or replace a portion of the configuration of each of the embodiments.

LIST OF REFERENCE SIGNS

10: light source device (main body)
11: case
50: liquid crystal display element
12: LED substrate
13: heat sink
14*a*, 14*b*: LED
15: LED collimator
16: synthetic diffuser block
17: light guide
171: light guide light entrance portion (surface)
172: light guide light reflection portion (surface)
172*a*: reflection surface
172*b*: connection surface
173: light guide light exit portion (surface)
21: polarization converting element
211: PBS film
212: reflective film
213: ½λ phase plate

The invention claimed is:

1. An LED light source device comprising:
   a solid-state light source;
   a collimating optical system that converts light having exited the solid-state light source into a substantially collimated light;
   a polarization converting element that aligns a polarization direction of light emitted from the collimating optical system in one direction;
   a light guide that enters the light in the polarization direction aligned in the one direction from the polarization converting element, and emits the incident light in a direction different from the incident direction; and
   a diffuser element that defuses the light from the polarization converting element,
   wherein the polarization converting element is arranged between the collimating optical system and the light guide,
   wherein the polarization converting element is arranged between the collimating optical system and the diffuser element,
   wherein the light guide includes:
      an entrance portion that allows the light to enter;
      a reflection portion that reflects the light having entered; and
      an exit portion that allows the light reflected by the reflection portion to exit,
   the reflection portion includes:
      a plurality of reflection surfaces that reflects that light having entered; and
      a plurality of connection surfaces that connect the plurality of reflection surfaces to one another,
   wherein elevation angles of the reflections surfaces formed on the reflection portion of the light guide differ depending on location, and a relative angle between the reflection surface and the adjacent connection surface is greater than or equal to 90 degrees, and
   wherein the relative angle between the reflection surface and the adjacent connection surface is a constant value regardless of location.

2. The LED light source device according to claim 1, wherein the entrance portion has a structure that allows the light to be deflected in a direction in which an angle of entry of the light entering the reflection surfaces of the reflection portion is greater than a critical angle with respect to the reflection surfaces of the reflection portion.

3. The LED light source device according to claim 2, wherein a scattering member is provided between the collimating optical system and the light guide, and
   the connection surface of the reflection portion is tilted at an angle within a range of half the angle of the scattering member such that the connection surface is shadowed with respect to the light having entered.

4. The LED light source device according to claim 2, wherein a deflecting structure of the entrance surface of the light guide is an inclined surface obliquely arranged with respect to the light having entered.

5. The LED light source device according to claim 2, wherein Lr is a length of an inclined surface projected in a normal direction with respect to a direction of exiting the plurality of reflection surfaces of the reflection portion,
   Lc is a length of an inclined surface projected in a normal direction with respect to a direction of exiting the connection surface connecting the reflection surfaces to each other at a position opposite to the entrance surface, and
   a ratio Lr/Lc is varied depending on location.

6. The LED light source device according to claim 2, wherein Lr is a length of an inclined surface projected in a normal direction with respect to a direction of exiting the plurality of reflection surfaces of the reflection portion,
   Lc is a length of an inclined surface projected in a normal direction with respect to a direction of existing the connection surface connecting the reflection surfaces to each other at a position opposite to the entrance surface, and
   a ratio Lr/Lc is the smallest in the vicinity of a center of the reflection portion.

7. The LED light source device according to claim 2, wherein Lr is a length of an inclined surface projected in a normal direction with respect to a direction of exiting the plurality of reflection surfaces of the reflection portion,
   Lc is a length of an inclined surface projected in a normal direction with respect to a direction of exiting the connection surface connecting the reflection surfaces to each other at a position opposite to the entrance surface, and
   a sum of lengths Lr and Lc is substantially constant.

8. The LED light source device according to claim 5, wherein Lr is a length of an inclined surface projected in a normal direction with respect to a direction of exiting the plurality of reflection surfaces of the reflection portion,
   Lc is a length of an inclined surface projected in a normal direction with respect to a direction of exiting the connection surface connecting the reflection surface to each other at a position opposite to the entrance surface, and
   the sum of lengths Lr and Lc is less than or equal to 0.6 mm and greater than or equal to 0.2 mm.

9. An electronic device that uses the LED light source device according to claim 1 as an image display device.

10. The electronic device according to claim 9, wherein the electronic device is an HUD.

11. The electronic device according to claim 9, wherein the electronic device is a projector.

* * * * *